March 29, 1938.  J. N. HELTZEL  2,112,489
COMBINATION TRAFFIC LINE AND JOINT INSTALLING MACHINE
Filed Dec. 12, 1933  5 Sheets-Sheet 1

Inventor:
J. N. HELTZEL
By McKinney & McKinney
Attorneys

March 29, 1938. J. N. HELTZEL 2,112,489
COMBINATION TRAFFIC LINE AND JOINT INSTALLING MACHINE
Filed Dec. 12, 1933 5 Sheets-Sheet 2

Inventor:
J. N. HELTZEL

March 29, 1938.  J. N. HELTZEL  2,112,489
COMBINATION TRAFFIC LINE AND JOINT INSTALLING MACHINE
Filed Dec. 12, 1933  5 Sheets-Sheet 3
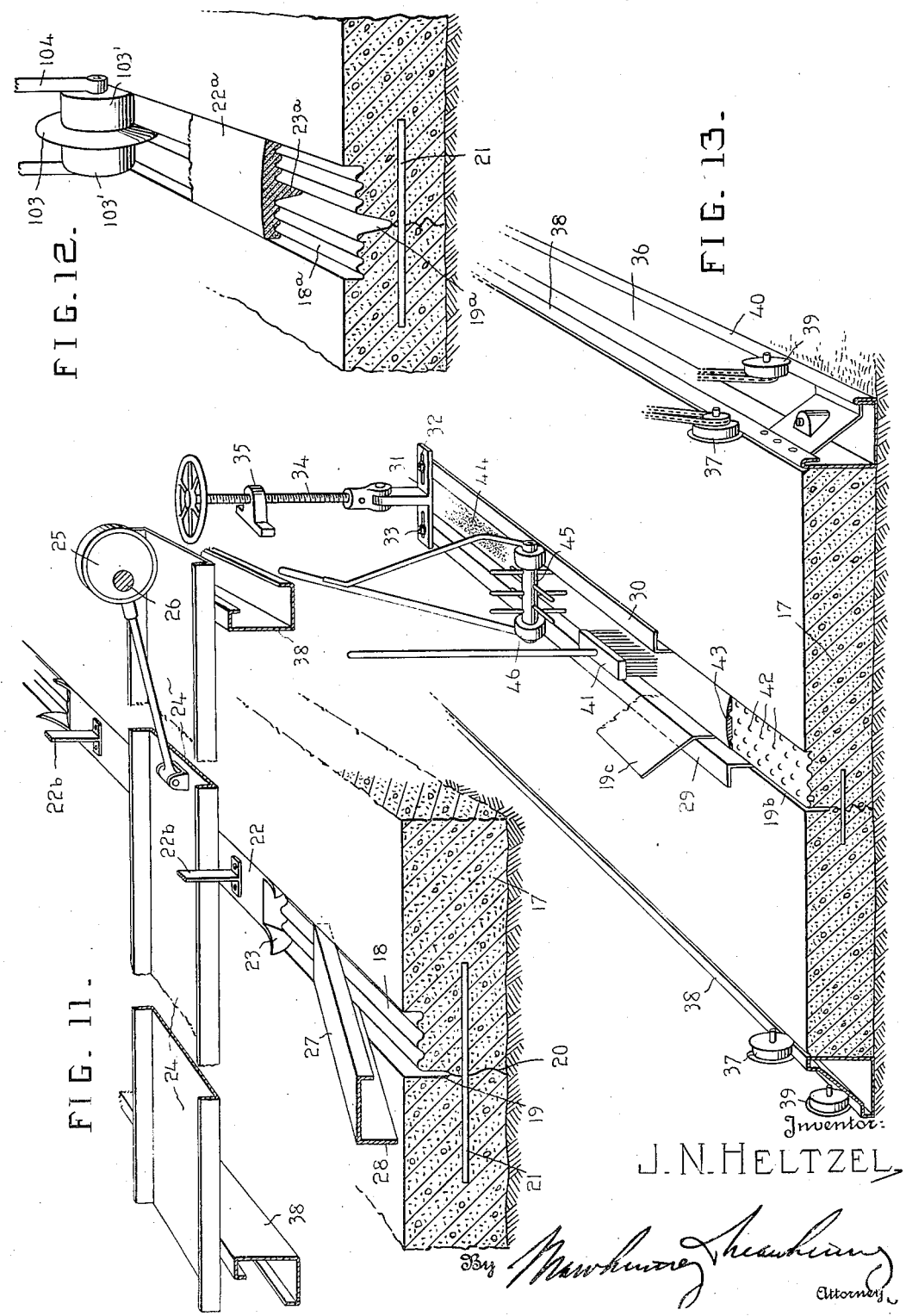
Inventor:
J. N. HELTZEL

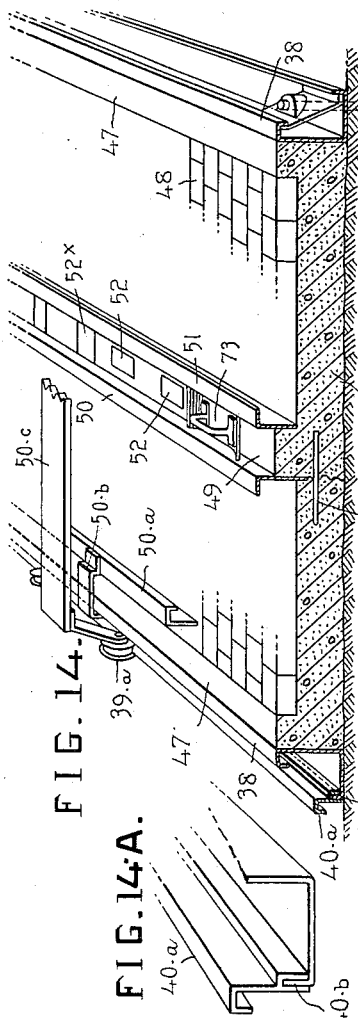
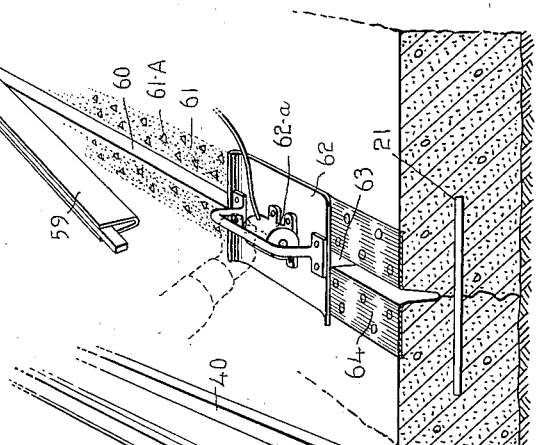
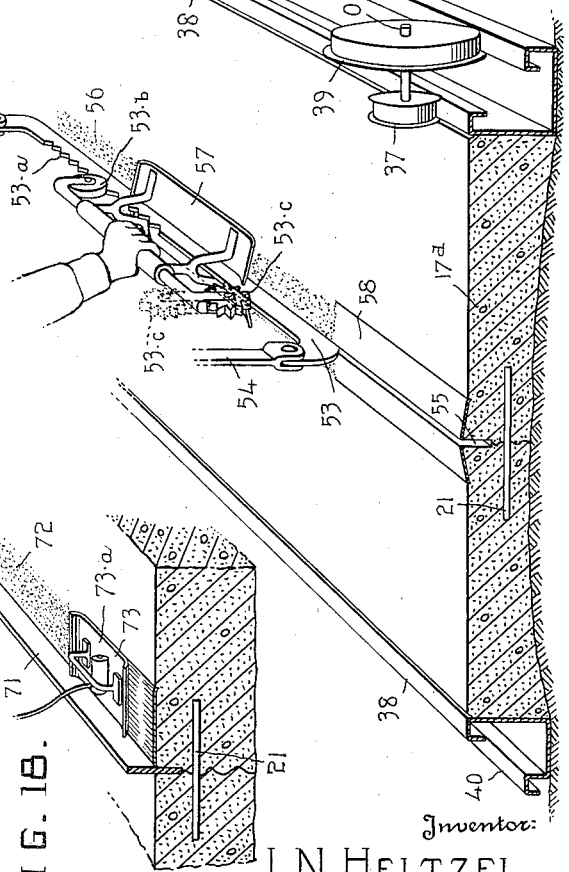
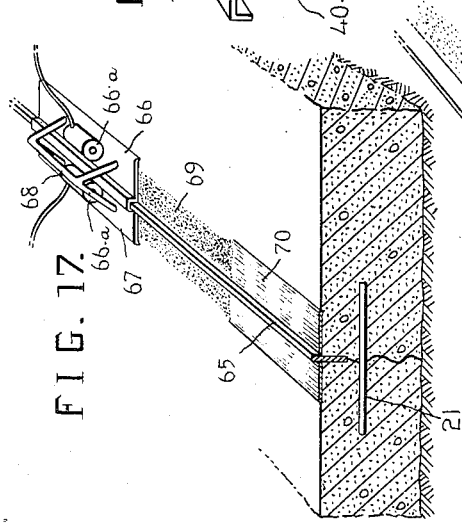
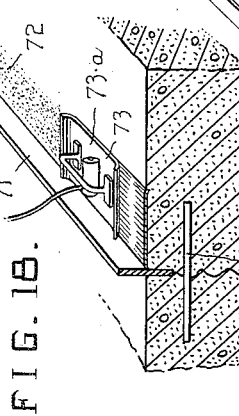

March 29, 1938. J. N. HELTZEL 2,112,489
COMBINATION TRAFFIC LINE AND JOINT INSTALLING MACHINE
Filed Dec. 12, 1933 5 Sheets-Sheet 5
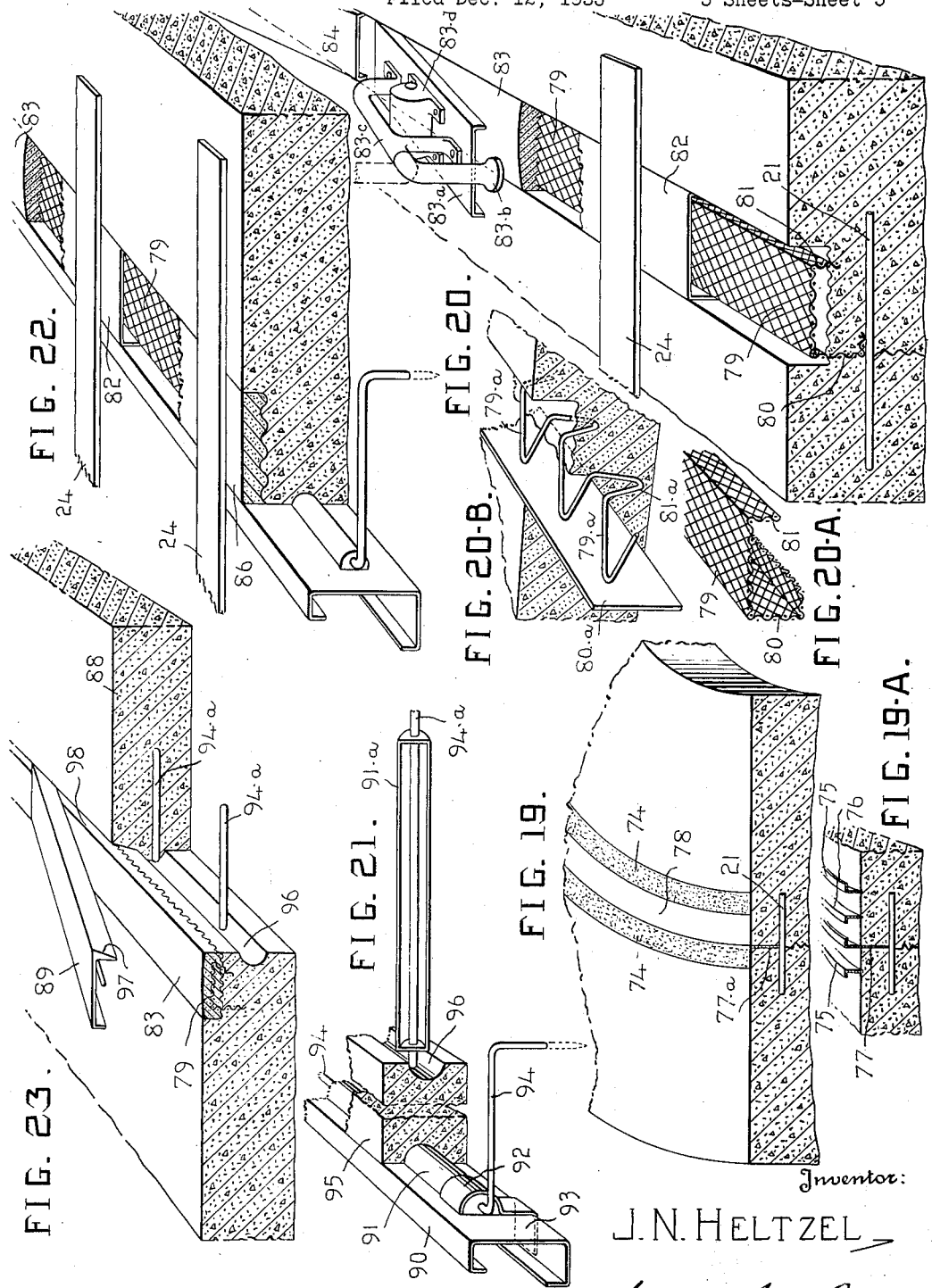
Inventor:
J. N. HELTZEL Patented Mar. 29, 1938

2,112,489

UNITED STATES PATENT OFFICE 2,112,489

COMBINATION TRAFFIC LINE AND JOINT INSTALLING MACHINE

John N. Heltzel, Warren, Ohio

Application December 12, 1933, Serial No. 702,052

8 Claims. (Cl. 94—45)

The present invention relates to improvements in combination traffic line and joint installing machines, and is a continuation in part of my prior co-pending application filed December 16, 1929, Serial No. 414,538, which prior application was a division of my Patent No. 1,740,345, granted December 17, 1929 on an application Serial No. 6,806 filed February 4, 1925.

The invention has for an object to provide certain improvements over the device illustrated, described and claimed in said co-pending application and has, in common with the objects of that prior invention, as its chief purpose the provision of novel and improved means for installing both joints and traffic lines in a roadway under construction.

The invention has for its further purpose the provision of a traveling bridge or carriage which moves over the roadway under construction and supports implements for routing out the plastic concrete to produce a relatively wide channel to receive traffic line material contrasting with the color of the material of the remainder of the surface of the road and a deeper joint groove which will induce cracking of the concrete and the production of slabs which may locally expand and contract without causing haphazard breaking of the surface of the concrete.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a plan view of a traveling bridge or apparatus, showing the longitudinal blades supported thereby and gauged by the side forms.

It will be noted that Figures 1 to 10 inclusive are duplicated from parent application Serial No. 6,806 filed February 4, 1925, which developed into Patent No. 1,740,345.

Figure 11 is a perspective view showing a section of a concrete roadway partly broken away and partly shown in section, and of implements for operating upon the roadway in accordance with the present invention.

Figure 12 is a similar view showing a modified form of implement for cutting a central joint groove.

Figure 13 is a perspective view taken the entire width of the roadway and showing the road forms and the concrete slabs in section with apparatus for mixing traffic line material with the material of the roadway.

Figure 14 is a similar view of a brick surface pavement with traffic line down the longitudinal center thereof.

Figure 14ª is a fragmentary perspective view of a modified construction of side form.

Figure 15 is a similar view showing an improved form of cutter and finishing tool.

Figure 16 is a fragmentary perspective view taken through a portion of a concrete slab and showing an improved method of finishing and inserting joint material.

Figure 17 is a similar view showing a method of surfacing where an initially raised joint is employed.

Figure 18 is a similar view showing a modification of Figure 17.

Figure 19 is a fragmentary perspective view showing dual or spaced traffic lines.

Figure 19ª is a similar view showing the means for producing such dual traffic lines.

Figure 20 shows a reinforced traffic line.

Figure 20ª shows the reinforcing employed in Figure 20.

Figure 20ᵇ shows a modified reinforcing in combination with a joint strip which may be used in lieu of Figure 20ª.

Figure 21 represents a method of installing dowel rods in half-width road construction.

Figure 22 shows traffic line construction as applied to the building of half-width roads, and Figure 23 represents the completion of a half-width road construction involving the installation of traffic line.

Figure 1:
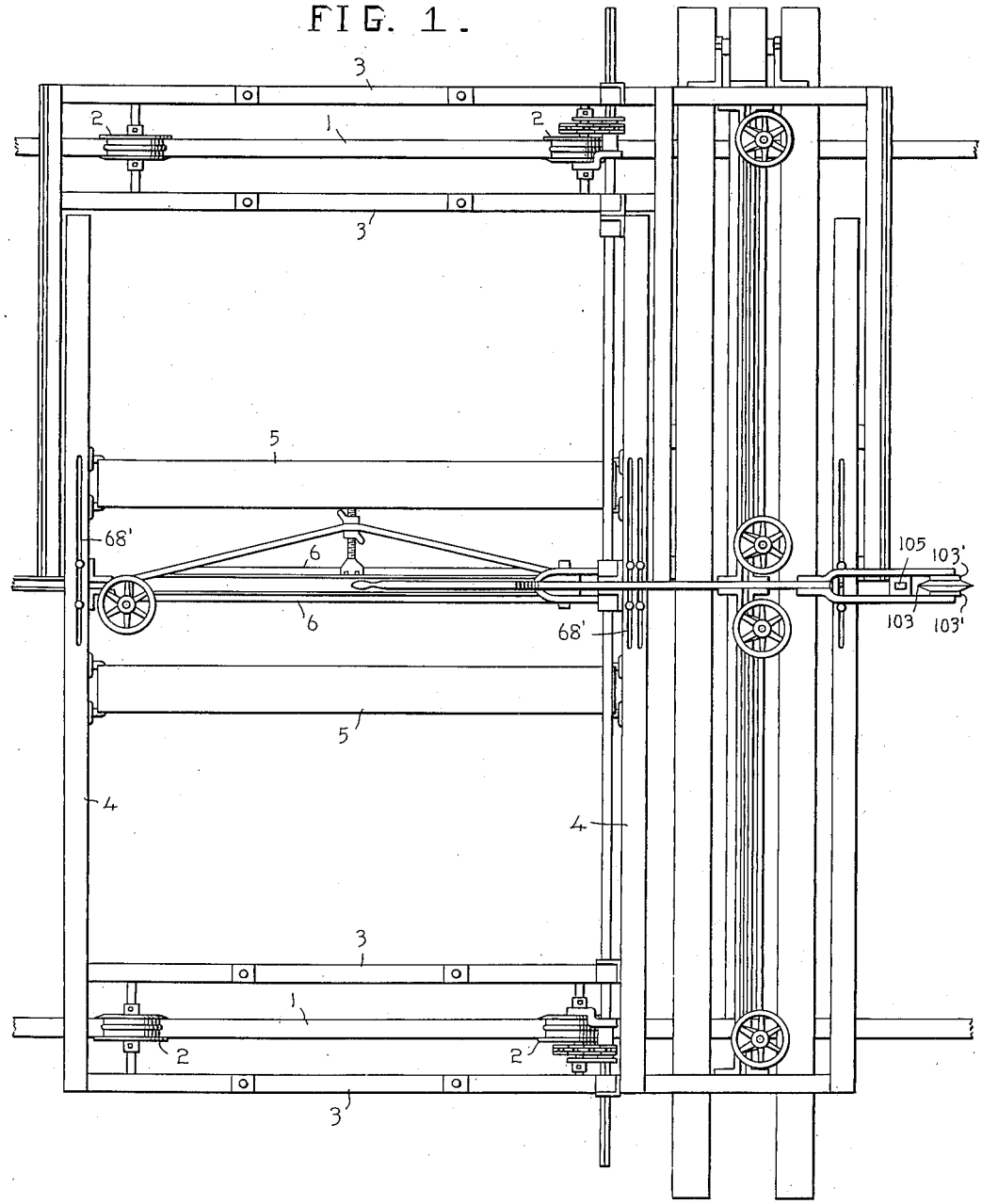

Referring to Figure 1, 1 represents side forms defining the edge of the road. 2 represents wheels supported in suitable frames 3. Transverse trusses or frames 4 span the roadway. Spaced longitudinal platform 5 are provided for the convenience of workmen. Spaced blades 6 repose between transverse trusses 4 provided for up and down movement to and from the concrete, and also provision for lateral adjustment of the spaced blades so that the spaced blades may be adjusted to the center of the roadway. The spaced blades are also adjustable to various widths and accommodate various thicknesses of joints or traffic line members to permit insertion of various widths of material to be positioned between the blades.

Means 103 and 105 are provided at suitable distance in advance of the spaced blades to separate the stones or coarser aggregate along a predetermined line followed by the spaced blades to be positioned over the line of separation. Any suitable implement may be used to spade the concrete between the blades and if desired to rout out or remove any desirable amount of concrete to facilitate the insertion of joint strip or removable joint strip or form.

There are roller portions 103' associated with the disc cutter 103 to depress the concrete along the cleavage made by cutter 103. The follower blade 5 trails rearwardly of disc 103 which may widen the groove formed by the disc 103.

After the joint strip or form has been deposited between the blades and the plastic concrete finished and smoothed along the joint the machine is moved forward either manually or by power to a new position and the operation is repeated to facilitate finishing along the deposited form. The member 6, 6 may be shifted laterally in slots 68'.

The spaced blades may be adjusted to any desired height above the plastic structure or may be lowered into the plastic structure and moved longitudinally of themselves when suspended above the structure or when the blades are positioned in the plastic structure.

Figure 4:
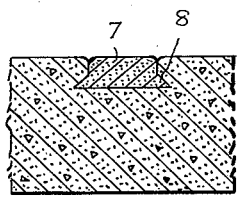
Figure 4 is a similar view showing the traffic line strip or material installed.

When plastic material is required to be positioned between spaced blades, such as when building colored concrete-traffic lines as Figure 4, the blades are used for defining the edges of the plastic traffic line, which may be raised to a suitable height above the surface of the roadway and suitable finishing tools may be inserted and guided between the spaced blades for shaping and alining the plastic material.

Figure 2:
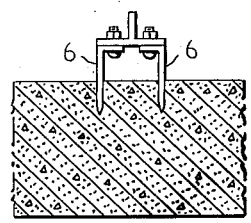
Figure 2 is a fragmentary vertical section through a slab of concrete showing the spaced blades positioned in the concrete prior to the routing or cleaving operation.

Figure 2 represents a section of the roadway in which 6 represents the spaced blades which are adjustable to various widths as may be required for installing narrow joints or may be widened out to the desirable width as may be required for the building of plastic traffic lines or for the positioning of longitudinal traffic lines formed between them. The blades 6 are suspended within the traveling bridge, as described in Figure 1, for movement longitudinally of themselves either in the concrete or positioned above the concrete or in contact with the surface of the concrete as conditions may require.

In Figure 2 it will be noted that the blades 6 are in position as would be required in cases where concrete is to be routed from between the blades to permit the reception of suitable plastic joint material or traffic line form or joint material as the case may be.

If joint material is to be positioned between the blades, as shown in Figure 2, the blades would be closed and brought together accordingly, so that the blades would be substantially in contact with the joint material to support the joint strip and support it in a vertical position to true alinement, while the plastic concrete is being finished adjacent to the strip, it being understood that the blades may be manipulated in and out of the concrete as conditions might require.

Figure 3:
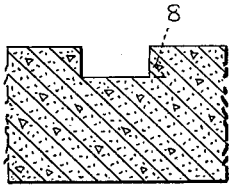
Figure 3 is a similar view showing the concrete structure after the routing operation.

Figure 3 represents a section of the concrete showing the blades removed after surplus concrete has been routed out, producing a channel to receive suitable traffic line material, traffic line form or joint strip as might be required, it being understood that the blades are left in position while the colored concrete is being deposited between the blades and leveled off and shaped and finished using blades as guides.

Figure 4 represents a section of the concrete showing the traffic line 7 after it has been applied, it being understood that the spaced blades 6 have been left in position to aline the traffic line 7 while it was being installed, tamped, leveled or gauged to proper height and shaped and finished. It will be noted that the traffic line is keyed or undercut as shown at 8 to provide a more efficient bond.

Figure 5:
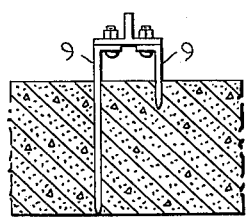
Figure 5 is a fragmentary vertical section similar to Figure 2 showing a modified form of implement composed of spaced blades of unequal depth employed to form a combination traffic line and joint prior to the routing operation.

Figure 5 shows spaced blades 9 which may be used in lieu of spaced blades 6 in Figure 2 for producing a combination joint and traffic line.

It will be noted that one of the blades is of less depth than the opposite blade. Thus it will be understood that the deep blade is used for producing a cut of suitable depth in the plastic concrete to form a joint. It may not be desirable to cut entirely through the slab, it being understood that blades may be lowered into the plastic concrete to any depth as might be required.

Figure 10:
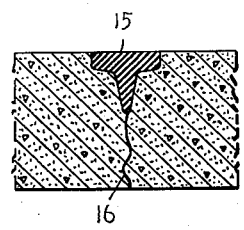
Figure 10 is also a similar view showing a completed combination traffic line and joint as shown in Figure 9 after the removable member has been displaced with suitable filler.

The same process is used for manipulating the blades in Figure 5 as shown in Figure 2, it being understood that when the joint producing blade 9 penetrates the plastic concrete to a partial distance through the slab, a crack will develop from the bottom of the blade through to the bottom of the slab, as indicated in Figure 10, producing the desired results for controlling the longitudinal cracking of the structure.

Figure 6:
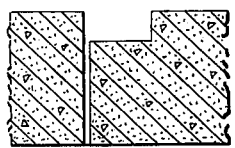
Figure 6 is a similar view after the routing operation has been completed and the blades removed.

Figure 6 represents a section of the concrete with the blades removed out of position, it being understood that surplus material had been routed from between the blades substantially as described in Figure 3, except that the channel may be filled with tar, macadam after the road surface has hardened the macadam or similar material producing a black traffic line and sealing the joint.

Figure 7:
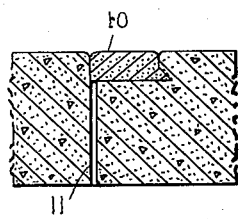
Figure 7 is a similar view taken after the traffic line strip or material has been installed, showing the completed combination joint and traffic line.

Figure 7 represents the combination traffic line 10 and joint 11, it being understood that the joint 11 may be cut partially or entirely through the slab as described in Figure 5.

Figure 8:
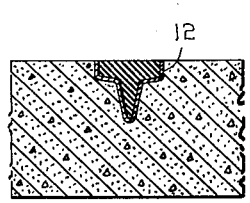
Figure 8 is a vertical section taken through a fragment of concrete roadway showing a modified form of combination joint and traffic line inserted in the plastic concrete.

Figure 8 represents a modified form of construction showing a section of concrete with the joint form 12 inserted in the plastic material, between the blades 6, described in Figures 1 and 2. By positioning the blades longitudinally along the line of the location of the joint, routing the concrete between blades and positioning the joint strip or form 12 between the blades and holding the member 12 to vertical position and alinement between the blades, finishing the plastic material adjacent to the form and moving the blades from in contact with the form as the various operations have been completed.

The joint member 12 may be of any suitable material and may be left in place or removed as may be desired.

Figure 9:
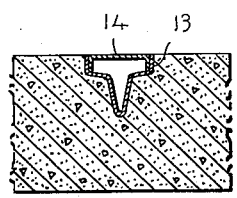
Figure 9 is a similar view showing another modification involving the use of a removable traffic line form positioned between spaced blades.

Figure 9 represents a section of the concrete showing a tubular joint producing member or form 13 having a cap strip 14. This form member may be removed from the plastic concrete for producing a channel in the concrete to be filled with suitable material. This joint strip is positioned between spaced blades substantially as heretofore described.

Figure 10 represents the joint as described in Figure 9 after the joint form 13 has been removed and the space filled with a suitable joint material 15 either by pouring the joint or inserting suitable premolded joint material, thereby producing a combination joint and traffic line.

The crack 16 will be induced into the lower part of the slab below the joint which will control the longitudinal cracking as heretofore described.

Referring more particularly to Figure 11, 17 represents the concrete road or surfacing structure, 18 designates the channel, and 19 the groove formed in the concrete in combination with the channel 18. This construction is substantially as indicated in Figure 6, with the exception that the groove 19 does not extend downwardly the full depth of the concrete slab but terminates short of the sub-grade, and induces a crack 20 to develop longitudinally of the roadway under the groove 19. There is shown a tie bar 21 positioned in the concrete crosswise of the crack 20 to connect the slabs and prevent separation of them.

At 22 is represented a channel-forming member, substantially as shown in my copending application filed August 6, 1931, Serial No. 555,619, which also has a grooving blade or implement 23 associated therewith. This combination channel and grooving member is supported by a wheel carriage, such as shown in Figure 1, or in my prior Patent No. 1,740,345, and is arranged for vertical and longitudinal adjustment by members 22ᵇ. A screed or surfacing member 24 is positioned over the channel or grooving member 22 and may be reciprocated transversely by the eccentric 25 which is carried by the carriage or traveling bridge and is rotated by means of an eccentric shaft 26. The surfacing member 24 surfaces the concrete simultaneously as the grooving and channeling member 22 is moved longitudinally through the plastic material either backwards or forwards, as many times as may be deemed advisable to secure the best results to produce the channel 18 in combination with the groove 19. It will be understood, however, that the channeling and grooving member 22 may be attached to the conventional finishing machine well known in the art for forming the channel and groove. It may be deemed desirable to install temporary cover plates or protecting members 27, which consist of light metal, preferably channel-shaped sections of convenient lengths, which are positioned within the channel 18 immediately rearwardly of the grooving and channeling implements 22 and 23 after the channeling member has made its last pass through the plastic material. The part 27 has a long depending leg 28 which seats down into the groove 19 to maintain the groove in an open condition. After the members 27 have been positioned, the final surfacing of the concrete is performed over the cover or protecting plate 27, and after the concrete has taken its initial set the members 27 are withdrawn from the concrete which will complete the forming of the combination channel 18 and groove 19. It will be noted that the channeling member 22 is provided with a corrugated under-surface to produce the corrugations shown in the bottom of the channel 18, such corrugations affording a better bond to the traffic line material which is placed within the groove. This traffic line material may consist of white cement, or cement of different colors, or of a bituminous material as may be required.

It will be noted that the screed 24 spans the entire width of the road and rests on the top tread of the side forms 38. The lugs 22ᵇ are means for connecting the channeling and grooving member 22, 23 to the carriage and are to be adjustably attached to the carriage for movement in and out of the concrete and longitudinally of the roadway.

Referring more particularly to Figure 12, herein I have shown a modified form of traffic line and joint, similar to Figures 8, 9 and 10. It will be understood that a channeling member 22ª, in combination with a grooving member 23ª, is used in the same manner as described of the combination member in Figure 11, to form the channel portion 18ª and the joint portion 19ª.

The disc 103, as shown on the machine in Figure 1, may be employed to form the joint groove 19ª and the flat hub portions 103' are for the purpose of forming the base of the channel 18ª. This construction is also shown in my Patent No. 1,740,345. The complete unit constitutes a roller and disc which is attached by the arms 104 to the carriage. The disc portion 103 is moved in the plastic concrete to produce the groove 19ª and the hub portions 103' press the stone or coarse aggregate so as to preform the channeling portion 18ª. It will be noted that the combination disc and roller is supported by the carriage and works in the plastic concrete forwardly to preform the groove and the channel after which the groove and channel receives its final forming operations. After the channel and groove have been completed, the groove and channel are filled with a plastic material, it being preferable to use plastic material, such as asphalt or bituminous materials in connection with this T-shaped traffic line and joint.

Figure 13 represents a modified form of constructing combination traffic lines and joints in which 17ᵇ represents the roadway, 29 represents the joint forming element, which is positioned in the plastic concrete to form the groove 19ᵇ and to define the longitudinal edge of the channel forming portion.

At 30 is represented a longitudinal member which is spaced away from the combination member 29 a proper and suitable distance. The members 29 and 30 are secured together by the transverse strip 31 having slots 32 to receive bolts, screws or other fastenings 33 which engage the members 29 and 30. By loosening the fastenings 33 the members 29 and 30 may be moved together or apart. This yields lateral adjustment of the members. The strips 31 are associated with screw members 34 which operate through threaded portions 35 on the carriage or bridge. It will be understood that the apparatus is secured to a traveling bridge or a finishing machine well known in the art and that such finishing machine or bridge is supported on the top tread of the side forms 36 by wheels 37 for movement of the carriage over the roadway. Because of the excessive weight, together with the vibration of modern finishing machines, it is advisable to provide special side rails or forms so constructed as to produce double treads to accommodate one set of wheels of the machine on the top tread 38 and a second set of wheels 39 on the lower or bottom treads 40. Such arrangement will prevent the machine from depressing the forms so that when the longitudinal members 29 and 30 are regulated to penetrate the concrete to a predetermined depth, the forms will not depress or tip inwardly, thereby maintain a constant elevation of the groove and channel forming members.

It will be understood that, by using this method, the mortar portion of the concrete material may be brushed away from between the longitudinal members 29 and 30, for instance by the use of a wire brush 41. Such operation will not disturb the stone or coarse aggregate, which will remain undisturbed but projecting from the body of the slab as indicated at 42. Suitable traffic line material 43, which may consist of white or other colored cement, is placed between the members 29 and 30 and smoothed or shaped up as requirements may be. It may be deemed advisable in some cases not to remove any material at all from between the members 29 and 30, and a colored traffic line may be readily secured by depositing lamp black or other suitable material, as indicated at 44. Such lamp black will be deposited between the members 29 and 30 and agitated to mix by the mixing member 45. Such mixing member may employ rollers 46 which operate on the top flanges of the members 29 and 30. After the coloring material has been thoroughly mixed a suitable smoothing tool is positioned between the blades and the material smoothed down which completes the operation, and then the carriage is moved forwardly to a new position, and the various operations repeated.

It may be desirable to insert a paper strip 19$^c$ along the joint forming blade 29 so that the strip is moved down into the groove 19$^b$ to serve as a permanent separator or joint longitudinally of the roadway. After the traffic line material has been placed and finished and after the apparatus has been moved forward, the surplus portion of the paper strip 19$^c$ is folded over the finished traffic line to protect the traffic line in order to prevent disfiguration or discoloration, which might occur while performing the various curing operations, such as when earth or emulsion or other curing agents are used for the curing of the concrete road slabs. After the curing process has been completed the surplus portion of the paper strip 19$^c$ projecting above the surface of the roadway is torn away and that portion of the strip which projects into the groove 19$^b$ remains permanently in place, it being understood that the strip 19$^c$ may terminate flush with the top surface of the roadway to serve as a joint in combination with the traffic line, and other suitable means may be employed for protecting the traffic line against disfiguration.

Figure 14 represents a modified form of construction wherein 17$^c$ represents a concrete base, 47 indicates headers or shoulders, which are formed on the side of the road to constitute curbing to define the outside edges of the brick surface 48.

At 49 is indicated a raised traffic line which is built integral with the base including the joint forming portion. This joint forming portion is produced by the longitudinal member 50 projecting down into the plastic material, combined with the action of the longitudinal combination member 51. The member 51 is spaced away from the member 50 to define the width of the traffic line portion 49, which is positioned between the members. While the concrete is yet soft, inserts 52 are depressed into the plastic concrete. These inserts may be of different colored cement if desired, for instance a standard paving brick may be used. It will be understood that the members 50 and 51 may be moved forward as rapidly as the setting of the concrete will permit. The forming members 50 and 51 may be supported from a carriage for movement along the highway to serve as guides substantially as in the case in Figure 13.

A finishing tool 73 is inserted between the members 50 and 51 for surfacing the concrete 49. In some instances it may be required that the forming members 50 and 51 remain in position until the concrete has taken its initial set. In such cases several hundred lineal feet of members 50 and 51 might be required, it being understood therefore that the traveling carriage as described would be employed to facilitate the positioning and alining of the longitudinal members 50 and 51. After the concrete has taken its initial set or hardened, the members 50 and 51, which are of convenient length, will be removed and used over and over again. Simultaneously or progressively as the traffic line 49 is constructed the headers 47 are formed by positioning forms 50$^a$ longitudinally of the road and spaced away from the side forms 38 and held in spaced position by the spacer members 50$^b$. In order to perform the various finishing and jointing operations over the surface of the road, a traveling bridge not heretofore described is required to span the roadway. The spacer members 50$^b$, which are secured to the top treads 38 of the road forms, and project several inches above the top surface of the top treads 38 will not permit wheels or rollers to travel thereon. Therefore I have provided that wheels or rollers 39$^a$ of the traveling bridge 50$^c$ roll on the lower treads 40, the workman's platform 50$^c$ of the traveling bridge being raised above the spacer members 50$^b$ so as to provide ample clearance whereby the bridge can be rolled longitudinally over the roadway as may be required without encountering any projections.

Figure 14$^a$ represents a detachable lower tread portion 40$^a$, which may be detachably secured to the upturned edge 40$^b$ of the road form so that a standard road form, as indicated at 38 in Figure 11, may be utilized as described in Figure 14 by positioning the detachable lower tread 40$^a$ to the upturned edge of the standard road form as indicated by the detachable connection 40$^b$.

Figure 15 shows a modified form of constructing colored traffic lines, in which 17$^d$ represents a concrete roadway which has been surfaced. While the concrete is yet plastic a longitudinal blade 53 is moved longitudinally of itself through the plastic concrete by a wheeled carriage as heretofore described. The blade 53 is attached to the carriage by the supports 54 so that it can be moved up and down, in and out of the plastic material. The blade 53 forms the joint 55. Colored material 56 is applied to the surface of the plastic concrete along the blade 53.

This colored material is mixed, agitated or tooled into the plastic concrete of the road surface either on one side or both sides of the blade 53 as indicated by the tool or float 57. This colored material may consist of lamp black or colored pigment of any desired color, which will produce an outstanding colored traffic line as indicated at 58. After the concrete has hardened, the joint or groove 55 may be poured with an asphaltic filler. It will be noted that this traffic line is slightly raised because of the additional material which is applied along the traffic line, such material, as stated before, consisting of various different kinds of materials. This raised portion of the traffic line will assist in shedding the water from the traffic line and will assist in keeping the traffic line clean. It will be understood that the machine operates on the side forms and that there are upper and lower tread portions substantially as shown and described in connection with Figure 13.

In order to thoroughly tool and agitate the traffic line material or coloring into the surface of the roadway, the float or surfacer 57 is automatically vibrated by means associated with the longitudinal blade 53, which is corrugated, notched or roughened along its top edge, as indicated at 53ª, over which the roller member 53ᵇ rolls when the float 57 is reciprocated back and forth, causing vibrations to the float.

The top edge of the blade 53 may not be required to be roughened as indicated at 53ª, and in order to produce vibrations to the float 57 when used in combination with a smooth surfaced blade I use a toothed roller 53ᶜ, which when moved longitudinally in contact with the smooth top surface of the blade 53 will cause vibrations to be transmitted to the float 57.

It will be noted that the toothed roller 53ᶜ is shown in broken lines when swung out of engagement with the blade 53. Likewise the roller 53ᵇ may be disengaged so that when desired the float may be used without vibrating the same.

Figure 16 represents a modified method of coloring traffic line construction in which, while the slab is yet plastic, removable joint strips, as indicated at 59, are positioned in the plastic concrete. After the concrete has taken its initial set, the strips 59 are withdrawn, producing the groove 60.

While the material is yet plastic, lamp black or other suitable pigment, which may consist of white cement if desired in the proper quantities, is positioned on the soft concrete as indicated at 61. While the material is plastic, the floating implement 62, having a lower projecting portion 63 which moves in the groove 60, is reciprocated back and forth so as to properly mix or agitate the material and to bond it with the surface of the road material which will produce the colored traffic line 64. It will be understood that the groove 60 may be filled with a suitable asphaltic material as may be required.

At 61ª is shown pebbles or fine aggregate which may consist of granite or glass chips, radium, silica, phosphorous or aluminum material, or similar materials to reflect light rays. Such material may be tooled into the surface of the roadway to produce a luminous traffic line. In order to insure a permanent bond of one or more of the above-described materials I provide an electrically-operated vibrator 62ª, which causes vibrations in the float 62 progressively as the tool is moved longitudinally of the roadway.

It has been determined that when grooves in roadways are filled with a high-melting point filler, such filler becomes extremely brittle during cool weather and therefore cracks or spalls very readily. However when a low-melting point filler is used the filler becomes very plastic during high temperature of the weather. Therefore this is objectionable because the wheels of vehicles pick up the filler and disfigure the traffic line as well as the surface of the roadway.

To overcome the objections encountered in the two extremes as illustrated, I have found it practical and economical to use a low melting point filler material, such as asphalt or tar, to seal the bottom portion of the groove up to within approximately one-half inch of the road surface. This material will remain plastic during the coldest weather, and immediately after filling the bottom with low-melting point material, I complete the filling of the groove by using a high-melting point filler which will remain substantially hard during high temperature seasons and vehicle wheels will not pick up the filler or in other words the filler will not stick to the wheels of moving traffic to disfigure the traffic line or road surface. It is understood that the top course of filler consisting of high-melting point material may crack during cool weather. This crack will terminate at the bottom of the hard filler. Therefore surface water which would penetrate the crack would be arrested at the junction point of the low-melting point filler, which would prevent the water from penetrating further.

Figure 17 represents a modified form of traffic line and joint in which, while the concrete is yet plastic, a premolded joint strip 65 is positioned in the plastic concrete, either flush with the surface of the roadway or slightly raised above such surface as illustrated. A floating or finishing tool having spaced surfacing portions 66 and 67 and a handle 68, is moved longitudinally back and forth on the plastic material with the joint strip 65 projecting up between such spaced portions 66 and 67. This implement will serve to aline the premolded strip 65 which remains permanently in the structure. Colored traffic line material 69, which may consist of suitable pigment of different colors, is deposited on the surface of the roadway. While the concrete is yet plastic the surfacing portions 66 and 67 of the float are reciprocated back and forth.

Such action mixes the coloring and amalgamates it with the plastic material of the roadway producing the colored traffic line 70. Thereupon the top of the premolded strip 65 may be trimmed down flush with the top surface of the traffic line.

The tool 66 may be vibrated by the electrical vibrators 66ª.

Figure 18 represents another modified form of construction wherein 71 represents a blade, which is positioned in the plastic material of the roadway. While the blade is in position as shown to form a groove in the roadway, suitable traffic line material, as indicated at 72, is placed on top of the road surface. This material may consist of any suitable kind of admixture, including fine stone or chips mixed with the plastic material of the surface of the road and finished by a suitable implement, using the blade 71 as a guide. After the traffic line has been finished, the blade 71 is removed from the roadway, thus producing a combination traffic line and joint as indicated. The float 73 may be vibrated by electric vibrator 73ª.

Figures 19 and 19ᵃ show dual colored traffic lines 74, which are desirable on curves and hilltops in order to indicate exceptional hazards to traffic. The colored traffic lines 74 may be constructed as heretofore described. It will be noted that the dowel bar 21 is positioned across the joint 77ᵃ, which is produced by the blade 77 in Figure 19ᵃ. It will be understood that the spaced guides 75, 76 and 77 determine the width of the strips 74 and 78.

Referring to Figure 20, 21 represents the dowel bar imbedded in the concrete slab. While the concrete is being surfaced, a channel is produced in the top surface of the roadway by the method as described in Figure 11. Immediately after the channel has been formed in the plastic concrete, a wire mesh or expanded metal mat 79 is positioned in the plastic concrete, the bent down portion 80 serving as a joint member, as well as an anchorage for the mat; the bent down portion 81 is also depressed into the plastic concrete and serves to anchor the mat in position. After the mat has been placed in position, a metal cover plate 82 is positioned within the channel to prevent concrete from entering into the channel while the surfacing member 24 is moved on the top surface of the concrete to give it the final finishing. After the final finishing operation has been completed, the cover plate 82 is removed and the traffic line filler material 83 is positioned within the channel and bonded therein by the mat 79. After the concrete traffic line 83 has been completely formed and finished, temporary cover plates 84 are placed over the traffic line material 83 to protect the white cement traffic line against disfiguration while the curing process is being performed. After the road slab has sufficiently hardened, the cover plates 84 are removed and used over and over again.

A vibrated forming and finishing tool 83ᵃ is used to shape and surface the traffic line 83. The finishing tool has a suitable depending element 83ᵇ which is adjustably secured to the tool so that when the tool is down in contact with the material 83 the depending element will project through the plastic material 83 and contact the steel mesh or reinforcing mat 79 and vibrate the mat simultaneously as the plastic concrete 83 is vibrated by the tool 83ᵃ. A tubular handle 83ᶜ is provided for manipulating of the tool, which is vibrated by an electric vibrator 83ᵈ. A longitudinal portion of the depending element 83ᵇ projects into the tubular handle 83ᶜ so that the element may be swung or rotated around in and out of contact with the reinforcing mat, it being understood that the finishing tool 83ᵃ may be reciprocated longitudinally in contact with the traffic line material to surface the same while the tool is vibrated, or when desired the vibrator may be silenced and the tool operated over the surface without being vibrated.

It is to be understood that the main object of vibrating the tool is to firmly embed or set the reinforcing so that the line material will be thoroughly bonded to the reinforcing as well as to the road slab.

Figure 20ᵃ shows the expanded metal or reinforcing 79 as arranged for positioning within the channel.

Figure 20ᵇ represents a modified form of combination joint plate 80ᵃ to which is welded or otherwise secured the reinforcing mesh or wires 79ᵃ having depending anchor portions 81ᵃ. The combination as indicated serves as a reinforcing and bond to secure the traffic line material within the channel formed substantially as shown in Figure 20.

Figure 21 is Figure 13 of my Patent No. 1,939,007 and forms a basis for traffic line construction in connection with the building of concrete roads when built in half-width sections as will be more completely described in connection with Figures 22 and 23.

In Figure 21, 90 represents the side form of a roadway, against which is positioned a tubular-shaped member 91 held in position by the clamp member 92. Such clamp member is carried down and projects under the base of the road form, as indicated at 93, to retain the member 91 in place. The dowel rod 94 is bent at right angles and projects into the tubular member 91 so that that portion of the dowel rod as indicated at 94ᵃ will be confined within the tubular member. The concrete 95 is poured and finished and after the concrete has hardened the side forms 90 are removed. The tubular members 91 are disengaged from the concrete as indicated at 91ᵃ producing the groove 96 in the edge of the slab. It will be noted that the tubular member 91ᵃ is used as an implement to straighten the dowel bar 94ᵃ so as to position that rod at right angles to the road slab; after which the tubular member 91ᵃ is disengaged or slipped out of contact with the dowel rod and used over and over again. Likewise the clamp 92 and the support 93 are removed and used over and over again.

Figure 22 represents the construction of traffic lines in connection with half width roads, in which it will be noted that a traffic line form 86 is positioned against the side form to produce a channel by the screeding member 24. After the screeding operation, the traffic line form 86 is removed and wire mesh or expanded metal 79 is forced into the plastic material so as to become securely bonded therewith. A temporary channel shaped over plate 82 is then placed in position within the channel to prevent concrete from flowing into the channel while the surfacing member 24 completes the final surfacing of the roadway, and then immediately after the final surfacing operation and while the concrete is yet plastic, the cover plate 82 is removed and suitable traffic line material 83 is positioned within the channel and thoroughly bonded with the mesh 79. This description completes the construction of the first half width section of the roadway.

Figure 23 represents the road slab as described in Figure 22, showing the colored traffic line 83 after this section of the road has been securely set or hardened. The expanded metal or reinforcing mesh is indicated at 79, dowel bar is indicated at 94ᵃ, and the groove along the edge of the slab is indicated at 96. It is now desired to construct the adjacent slab 88, which is accomplished by positioning the temporary cover plate 89 over the traffic line 83. The cover plate has a V-shaped groove forming portion 97 to form a groove 98 in the top portion of the slab 88. The cover plate 89 will protect the traffic line 83 and will provide a surface on which the screeding or surfacing members may operate. After the slab 88 has been finished, the cover plate 89 is removed, which will form the groove 98, which may be filled with a plastic sealing material.

It is obvious that various changes and modifications may be made in the details of construction and design of the above specifically described embodiment of this invention without departing from the spirit thereof, such changes and modi-

What is claimed is:—

1. The method of forming combination joints and traffic lines in the surface of the concrete roadway under construction, consisting in pouring and surfacing the material, and while the concrete is yet plastic, moving a longitudinal joint member in the plastic material to produce a separation, while the blade is in position applying traffic line material along each side of the blade, mixing said material with the plastic material of the roadway longitudinally of the blade, and removing the blade and filling the groove produced by the blade.

2. A device for producing traffic lines in plastic roads under construction comprising means for forming a joint groove in the plastic material of the road at the sides of which traffic line material is placed, a finishing implement movable along said means, and means to vibrate the finishing implement to mix the traffic line material with the plastic material of the road.

3. A device of the character described comprising spaced blades for penetrating the plastic material of a road under construction whereby to receive traffic line material in the space between the blades, a rotary mixing device supported and rolling along the upper edge portions of said blades and having members projecting down into the space between the blades whereby to agitate the road material and the traffic line material and to commingle the same.

4. A device of the character described comprising spaced blades for penetrating for a distance the plastic material of a road under construction and for extending upwardly beyond the surface of such road, means for removing a portion of the road material from the space between the blades whereby to receive traffic line material to bring the surface up to normal with respect to the remainder of the roadway, and mixing means travelling longitudinally of the blades and projecting into the space between the blades for commingling the material of the road and the traffic line material.

5. A device of the character described comprising a blade adapted to penetrate plastic material of a road under construction, a finishing implement movable along said blade, said blade and implement having cooperating means for vibrating such implement during the course of its movement.

6. A device of the character described comprising a blade adapted to penetrate the plastic material of a road under construction, a finishing float movable longitudinally at the side of said blade, a roller carried by the float movable along the blade, said roller and blade having cooperating parts to cause vibration of the float on movement along such blade.

7. A finishing implement for use in forming traffic lines in roads comprising a projection adapted to enter a groove formed in the road under construction, whereby to guide said implement in its movement back and forth along the roadway, said implement having portions extending along the surface of the roadway at the sides of said groove whereby to tool traffic line material placed on such surface into the plastic material of the roadway, and means to vibrate said implement.

8. The method of producing joints and traffic lines in plastic concrete of a road under construction, consisting in pouring and finishing plastic concrete material, and while the material is yet plastic, placing a longitudinal blade in the top portion of the plastic material to produce a separation, applying a second longitudinal blade into the surface of the plastic concrete material spaced from the first mentioned blade whereby to produce a channel between the blades, removing the mortar portion of the concrete material from the channel, placing traffic line material in the channel which is of a contrasting color with the concrete material, and mixing the traffic line material with the plastic material of the roadway.

JOHN N. HELTZEL.